United States Patent
Kawano et al.

(10) Patent No.: US 9,859,795 B2
(45) Date of Patent: Jan. 2, 2018

(54) SWITCHING REGULATOR FOR DETECTING A PLURALITY OF ABNORMALITIES USING ONLY ONE COMPARISON CIRCUIT

(71) Applicant: SII Semiconductor Corporation, Chiba-shi, Chiba (JP)

(72) Inventors: Akihiro Kawano, Chiba (JP); Katsuya Goto, Chiba (JP)

(73) Assignee: SII Semiconductor Corporation (JP)

( * ) Notice: Subject to any disclaimer, the term of this patent is extended or adjusted under 35 U.S.C. 154(b) by 0 days.

(21) Appl. No.: 15/448,063

(22) Filed: Mar. 2, 2017

(65) Prior Publication Data

US 2017/0257028 A1 Sep. 7, 2017

(30) Foreign Application Priority Data

Mar. 7, 2016 (JP) .................. 2016-043654

(51) Int. Cl.
*H02M 3/158* (2006.01)
*H02M 1/32* (2007.01)

(52) U.S. Cl.
CPC ............ *H02M 3/158* (2013.01); *H02M 1/32* (2013.01)

(58) Field of Classification Search
CPC ...... H02M 1/32; H02M 3/155–3/1588; H02M 2001/0022; H02M 2001/0048
See application file for complete search history.

(56) References Cited

U.S. PATENT DOCUMENTS

| | | | | |
|---|---|---|---|---|
| 7,932,772 B1* | 4/2011 | Zarabadi | ............... | H02M 3/073 327/539 |
| 8,476,888 B1* | 7/2013 | Chen | ..................... | H02M 3/156 323/284 |
| 2007/0035281 A1* | 2/2007 | Kuroiwa | ............... | H02M 3/156 323/222 |
| 2007/0252744 A1* | 11/2007 | Takeuchi | ............ | H03M 1/1076 341/155 |
| 2009/0273324 A1* | 11/2009 | Okamoto | ................ | H02M 1/36 323/282 |
| 2010/0141225 A1* | 6/2010 | Isham | ................... | H02M 3/156 323/282 |
| 2010/0244800 A1* | 9/2010 | Nakamura | ............... | H02M 1/32 323/284 |
| 2011/0254524 A1* | 10/2011 | Ishii | ...................... | H02M 3/156 323/282 |
| 2011/0285426 A1* | 11/2011 | Takahashi | ............. | H02M 3/158 327/109 |
| 2013/0249509 A1* | 9/2013 | Nakamoto | .............. | G05F 1/468 323/271 |

(Continued)

FOREIGN PATENT DOCUMENTS

JP 2009-296714 A 12/2009

*Primary Examiner* — Yusef Ahmed
(74) *Attorney, Agent, or Firm* — Brinks Gilson & Lione

(57) ABSTRACT

To operate a plurality of abnormality detecting functions of a switching regulator with low power consumption and configure an occupied area of a semiconductor device to be reduced. A switching regulator is configured to be equipped with a comparison circuit, switch circuits, and a switch control circuit and to switch the switch circuits by control signals of the switch control circuit and realize a plurality of abnormality detecting functions by the one comparison circuit.

2 Claims, 2 Drawing Sheets

(56) References Cited

U.S. PATENT DOCUMENTS

| | | | | |
|---|---|---|---|---|
| 2014/0084885 A1* | 3/2014 | Ouyang | .................. | H02M 3/158 |
| | | | | 323/271 |
| 2015/0293545 A1* | 10/2015 | Cui | ........................... | G05F 1/46 |
| | | | | 323/281 |
| 2015/0349753 A1* | 12/2015 | Itakura | .................... | H03M 1/38 |
| | | | | 327/103 |
| 2015/0355654 A1* | 12/2015 | Ueno | ....................... | G05F 1/575 |
| | | | | 323/281 |
| 2016/0156260 A1* | 6/2016 | Kuang | .................... | H02M 1/32 |
| | | | | 323/234 |
| 2016/0218705 A1* | 7/2016 | Iwamoto | ........ | H03K 19/017509 |
| 2017/0187282 A1* | 6/2017 | Wang | .................... | H02M 3/157 |

* cited by examiner

SWITCHING REGULATOR FOR DETECTING A PLURALITY OF ABNORMALITIES USING ONLY ONE COMPARISON CIRCUIT

RELATED APPLICATIONS

This application claims priority under 35 U.S.C. §119 to Japanese Patent Application No. 2016-043654 filed on Mar. 7, 2016, the entire content of which is hereby incorporated by reference.

BACKGROUND OF THE INVENTION

1. Field of the Invention

The present invention relates to a switching regulator, and particularly to protection circuits of a switching regulator.

2. Background Art

A switching regulator has been used as a voltage supply source for various electronic apparatuses. Thus, various protection functions have been becoming important functions to ensure the safety of the electronic apparatuses.

FIG. 2 illustrates one example of a circuit diagram of a related art switching regulator. The related art switching regulator 200 is equipped with a feedback resistor 6, a reference voltage circuit 12, a comparison circuit 10, an R-S flip-flop circuit 13, an on-time control circuit 11, an output control circuit 15, driver circuits 16 and 17, power FETs 2 and 4, an inductor 3, and a capacitor 5. Further, the related art switching regulator 200 is equipped with a power supply voltage monitoring circuit 30, an overheat protection circuit 40, and a control circuit 14 as protection circuits.

The related art switching regulator 200 is equipped with various protection circuits such as the power supply voltage monitoring circuit 30 and the overheat protection circuit 40. Detected signals outputted respectively therefrom are inputted to the control circuit 14. In response to the detected signals of the various protection circuits, the control circuit 14 controls the comparison circuit 10 and the output control circuit 15 to protect the circuits from abnormal states.

The power supply voltage monitoring circuit 30 is equipped with a comparison circuit 31 which detects a power supply voltage (refer to, for example, Patent Document 1). The overheat protection circuit 40 is equipped with a comparison circuit 41 which detects a temperature.

Patent Document 1

Japanese Patent Application Laid-Open No. 2009-296714

When there are many objects to be monitored such as a power supply voltage, temperatures, etc., comparison circuits of a number equal to the number thereof arE required, thereby increasing the area of a semiconductor device. Further, since power corresponding to the number of the comparison circuits is consumed, current consumption is increased. Even though each comparison circuit is operated in time division, the time taken until the operation of the comparison circuit is stabilized is required when the comparison circuit is started, thus resulting in the consumption of an unnecessary current.

SUMMARY OF THE INVENTION

In order to solve the related art problems, a switching regulator of the present invention is configured as follows.

The switching regulator is configured to be equipped with a comparison circuit, switch circuits, and a switch control circuit and to switch the switch circuits by control signals of the switch control circuit and realize a plurality of abnormality detecting functions by the one comparison circuit.

According to the switching regulator of the present invention, it is configured to provide only one comparison circuit and switch the input of the comparison circuit by switch circuits to thereby obtain a plurality of detecting functions. Therefore, it is possible to reduce an occupied area of a semiconductor device and manufacture the same at a low cost. Further, by switching the input of the comparison circuit in time division, current consumption required for the startup time of the comparison circuit can be reduced as compared with the case where a plurality of comparison circuits are operated alternately in time division.

DETAILED DESCRIPTION OF THE PREFERRED EMBODIMENTS

Figure 1:
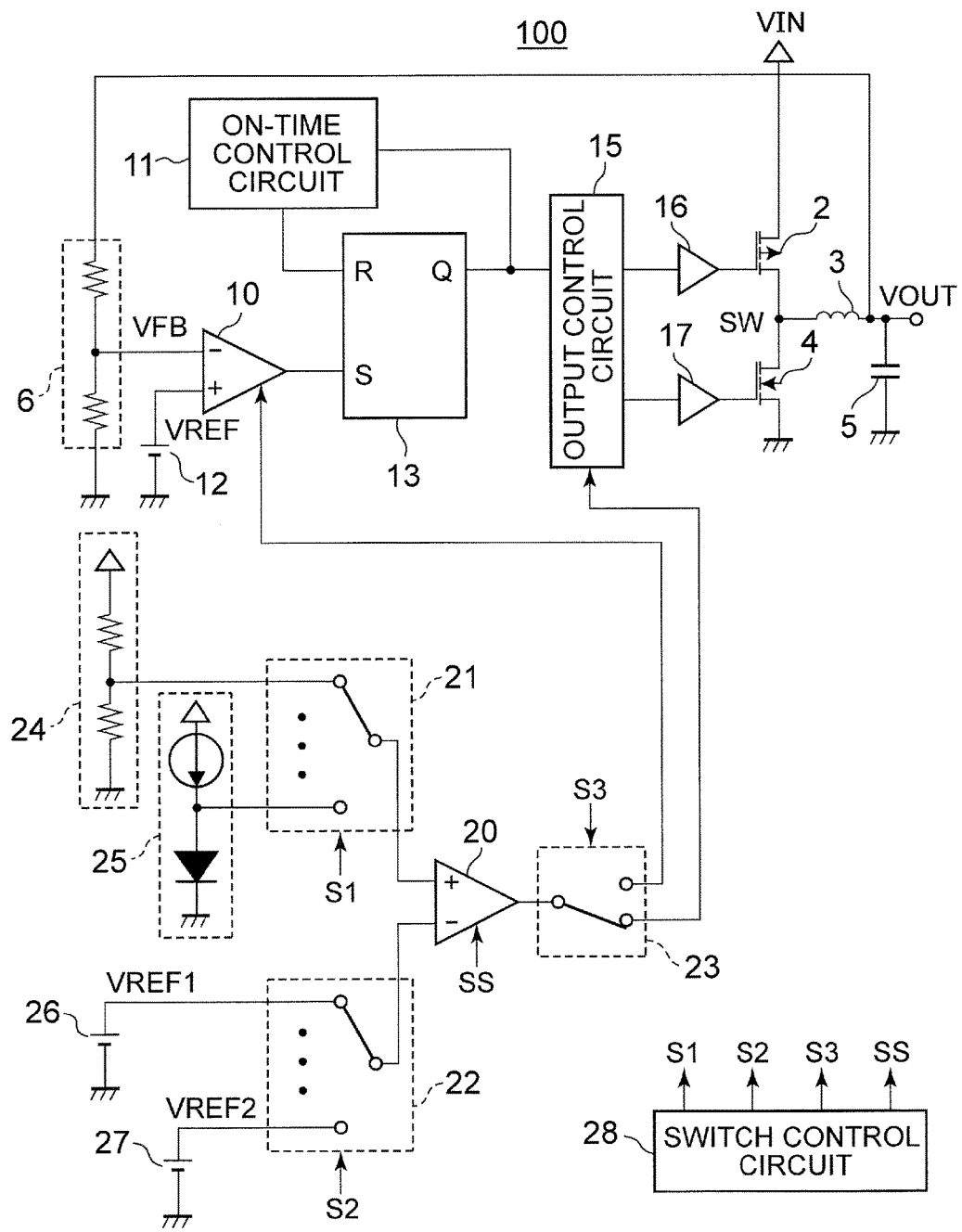
FIG. 1 is a circuit diagram illustrating one example of a switching regulator according to the present embodiment.
Figure 2:
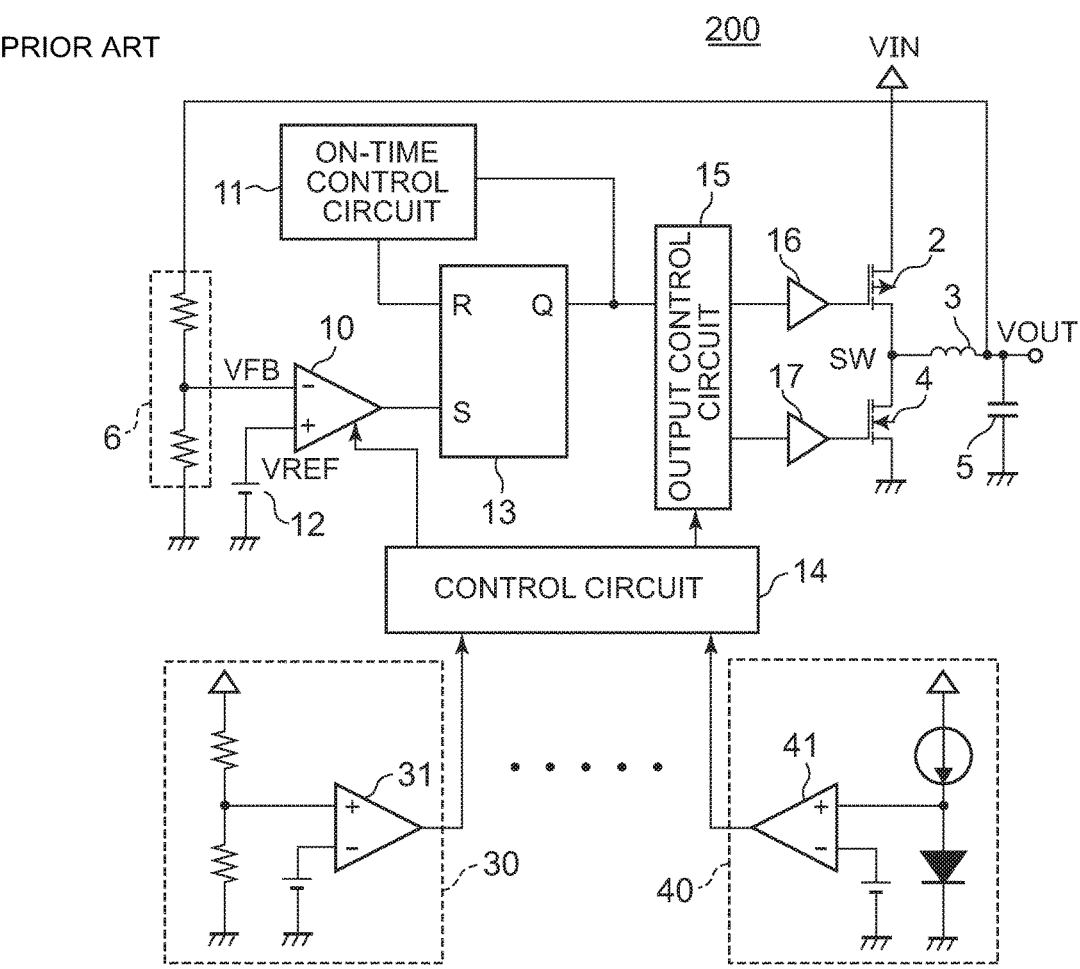
FIG. 2 is a circuit diagram illustrating a related art switching regulator.

FIG. 1 is a circuit diagram illustrating one example of a switching regulator according to the present embodiment.

The switching regulator 100 according to the present embodiment is equipped with power FETs 2 and 4, an inductor 3, a capacitor 5, a feedback resistor 6, a comparison circuit 10, an on-time control circuit 11, a reference voltage circuit 12, an R-S flip-flop circuit 13, an output control circuit 15, driver circuits 16 and 17, a comparison circuit 20, switch circuits 21 through 23, a voltage dividing circuit 24, a temperature sensor 25, reference voltage circuits 26 and 27, and a switch control circuit 28.

The feedback resistor 6 is connected between an output terminal OUT and a GND terminal. The comparison circuit 10 has an input terminal connected to an output terminal of the feedback resistor 6 and an output terminal of the reference voltage circuit 12. The R-S flip-flop circuit 13 has a set terminal S connected to an output terminal of the comparison circuit 10, a reset terminal R connected to an output terminal of the on-time control circuit 11, and an output terminal Q connected to an input terminal of the on-time control circuit 11 and an input terminal of the output control circuit 15. The driver circuit 16 has an input terminal connected to a first output terminal of the output control circuit 15, and an output terminal connected to a gate of the power FET 2. The driver circuit 17 has an input terminal connected to a second output terminal of the output control circuit 15, and an output terminal connected to a gate of the power FET 4. The power FET 2 has a source connected to an input terminal IN, and a drain connected to one terminal of the inductor 3 and a drain of the power FET 4. The output terminal OUT is connected to the other terminal of the inductor 3 and one terminal of the capacitor 5. A source of the power FET 4 is connected to the GND terminal. The other terminal of the capacitor 5 is connected to the GND terminal.

The comparison circuit 20 has a first input terminal connected to the switch circuit 21, a second input terminal connected to the switch circuit 22, and an output terminal connected to the switch circuit 23. The switch circuit 21 is provided with input terminals by the number of protection circuits, to which, for example, the voltage dividing circuit 24 for detection of a power supply voltage and the temperature sensor 25 for overheat protection are connected. The switch circuit 22 is provided with input terminals by the number of protection circuits, to which, for example, the reference voltage circuit 26 outputting a reference voltage VREF1 for voltage detection, and the reference voltage circuit 27 outputting a reference voltage VREF2 for overheat protection are connected. The switch circuit 23 has a plurality of output terminals connected to, for example, the comparison circuit 10 and the output control circuit 15. The switch control circuit 28 outputs control signals S1 through S3 to the switch circuits 21 through 23 respectively and outputs a control signal SS to the comparison circuit 20.

The aforementioned switching regulator 100 is operated as follows to protect the circuits from abnormal states.

With a signal turning on the power FET 2 outputted from the output control circuit 15 to the driver circuit 16 as a trigger, the switch control circuit 28 outputs the control signals S1 through S3 operating the protection circuits in time division to the switch circuits 21 through 23 respectively and outputs the control signal SS to the comparison circuit 20.

When the comparison circuit 20 receives the control signal SS therein, the comparison circuit 20 is supplied with an operating current by, for example, a switch being turned on, to start operating.

First, the control signal S1 causes the switch circuit 21 to be connected to the voltage dividing circuit 24, and the control signal S2 causes the switch circuit 22 to be connected to the reference voltage circuit 26. Thus, the comparison circuit 20 compares a voltage outputted from the voltage dividing circuit 24 and the reference voltage VREF1 and executes a power supply voltage detecting operation of detecting a reduction in the power supply voltage. At this time, the control signal S3 causes the switch circuit 23 to be connected to the output control circuit 15. When the reduction in the power supply voltage is detected, the control signal S3 serves to perform control to the output control circuit 15 to turn off the power FET 2.

Subsequently, the switch control circuit 28 sequentially outputs the control signals S1 and S2 switching the switch circuits 21 and 22 to switch abnormality detecting functions. Lastly, the control signal S1 causes the switch circuit 21 to be connected to the temperature sensor 25, and the control signal S2 causes the switch circuit 22 to be connected to the reference voltage circuit 27. Thus, the comparison circuit 20 compares a voltage outputted from the temperature sensor 25 and the reference voltage VREF2 and executes an overheat detecting operation detecting overheat of each circuit. At this time, the control signal S3 causes the switch circuit 23 to be connected to the output control circuit 15. When the overheat of the circuit is detected, the control signal S3 serves to perform control to the output control circuit 15 to turn off the power FET 2.

Here, the switch control circuit 28 controls the comparison circuit 20 to stop its operation by the control signal SS.

As described above, the switching regulator 100 according to the present embodiment is equipped with the comparison circuit 20, the switch circuits 21 through 23, and the switch control circuit 28 and adapted to switch the switch circuits 21 through 23 by the control signals S1 through S3 of the switch control circuit 28 and realize a plurality of abnormality detecting functions by one comparison circuit 20. Therefore, it is possible to decrease an occupied area of a semiconductor device and manufacture the semiconductor device at a low cost. Further, since the one comparison circuit 20 is driven in time division to realize the abnormality detecting functions, it is possible to reduce current consumption of the semiconductor device.

Incidentally, although the present invention has been described using the COT-controlled synchronous rectification-type circuit, the present invention is not limited to the switching regulator of this system.

Further, the circuits for realizing the protection functions, the items to be monitored, and the timing and order of starting the monitoring are examples and are not limited to them.

What is claimed is:

1. A switching regulator comprising:
   a first comparison circuit which compares a first reference voltage and a feedback voltage;
   an output control circuit which outputs an on-off control signal in accordance with an output signal of the first comparison circuit;
   a power FET controlled by the on-off control signal;
   a plurality of monitoring circuits for realizing a plurality of protection functions;
   a second comparison circuit;
   first and second switch circuits which switch connections between the plurality of monitoring circuits and first and second input terminals of the second comparison circuit;
   a third switch circuit which switches connections between an output terminal of the second comparison circuit and control terminals of the first comparison circuit and the output control circuit; and
   a switch control circuit which outputs first, second and third control signals to the first, second and third switch circuits,
   wherein the switch control circuit causes the second comparison circuit to detect a plurality of abnormalities in time division by switching the first, second and third switch circuits.

2. The switching regulator according to claim 1, wherein the switch control circuit outputs a control signal to the second comparison circuit to cause the second comparison circuit to operate when detecting the plurality of abnormalities.

* * * * *